(12) United States Patent
Nakamura

(10) Patent No.: US 7,955,728 B2
(45) Date of Patent: Jun. 7, 2011

(54) ELECTRICAL STORAGE DEVICE

(75) Inventor: Yoshiyuki Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 59 days.

(21) Appl. No.: 12/518,326

(22) PCT Filed: Dec. 21, 2007

(86) PCT No.: PCT/IB2007/004050
§ 371 (c)(1),
(2), (4) Date: Jun. 9, 2009

(87) PCT Pub. No.: WO2008/081285
PCT Pub. Date: Jul. 10, 2008

(65) Prior Publication Data
US 2010/0035157 A1    Feb. 11, 2010

(30) Foreign Application Priority Data
Dec. 21, 2006   (JP) ................... 2006-345069

(51) Int. Cl.
*H01M 6/18* (2006.01)
*H01M 2/16* (2006.01)
*H01M 4/02* (2006.01)
*H01M 4/64* (2006.01)
*H01M 10/0562* (2010.01)
*H01M 10/0564* (2010.01)

(52) U.S. Cl. ........ 429/149; 429/306; 429/304; 429/233; 429/137; 429/209

(58) Field of Classification Search .................. 429/304, 429/318, 306, 209, 233, 137, 149
See application file for complete search history.

(56) References Cited

U.S. PATENT DOCUMENTS

| | | | |
|---|---|---|---|
| 3,061,659 A * | 10/1962 | Wilke et al. | 427/58 |
| 3,972,727 A | 8/1976 | Cohn | |
| 2003/0082446 A1 | 5/2003 | Chiang | |
| 2005/0026037 A1 | 2/2005 | Riley | |
| 2007/0259271 A1 * | 11/2007 | Nanno et al. | 429/318 |

FOREIGN PATENT DOCUMENTS

| | | |
|---|---|---|
| JP | 59-056367 A | 3/1984 |
| JP | 2004-179053 A | 6/2004 |
| JP | 2005-11660 A | 1/2005 |
| JP | 2005-116248 A | 4/2005 |
| JP | 2005-149893 A | 6/2005 |
| JP | 2006-080084 A | 3/2006 |
| JP | 2007-005279 A | 1/2007 |
| WO | WO-2006/064774 A * | 6/2006 |

OTHER PUBLICATIONS

Machine Translation of JP 2005/116248, Ito et al., Apr. 2005.*

* cited by examiner

*Primary Examiner* — Jonathan Crepeau
*Assistant Examiner* — Kenneth Douyette
(74) *Attorney, Agent, or Firm* — Kenyon & Kenyon LLP

(57) ABSTRACT

An electrical storage device has a solid electrolyte layer; and electrode assemblies stacked with the solid electrolyte layer interposed therebetween and each having a current collector on which a plurality of electrode parts are formed. A part of the solid electrolyte layer is located between successive electrode parts in a direction perpendicular to the stacking direction on at least one of successive electrode assemblies in the stacking direction.

12 Claims, 11 Drawing Sheets

ELECTRICAL STORAGE DEVICE

This is a 371 national phase application of PCT/IB2007/004050 filed 21 Dec. 2007, claiming priority to Japanese Patent Application No. 2006-345069 filed 21 Dec. 2006, the contents of which are incorporated herein by reference.

FIELD OF THE INVENTION

The present invention relates to an electrical storage device having an electrode assembly including a current collector having a plurality of electrode parts formed thereon.

BACKGROUND OF THE INVENTION

Conventionally, an electrode assembly (including a cathode assembly, an anode assembly and a bipolar electrode) that includes a current collector having electrode layers (active material layers for cathode and anode) of generally uniform thickness on both sides of the current collector is used as the electrode assembly in secondary batteries, etc. Japanese Patent Application Publication No. 2005-149893 (JP-A-2005-149893) and Japanese Patent Application Publication No. 2004-179053 (JP-A-2004-179053) describe such a current collector.

Japanese Patent Application Publication No. 2005-11660 (JP-A-2005-11660) describes a secondary battery including electrode assemblies that each have a current collector on which a plurality of minute cells (electrode parts) forming an electrode layer are formed to relieve stress thereon. More specifically, a plurality of minute cells is arranged at regular intervals in a matrix on the current collector.

In the secondary battery described in JP-A-2005-11660, however, the following problems occur because the electrolyte layers are located only between minute cells on successive secondary battery electrodes in the stacking direction.

In the configuration described in JP-A-2005-11660, the regions without the minute cells on the current collectors are exposed, and the exposed portions are opposed to each other with a space therebetween. When the secondary battery receives an external force or when the secondary battery expands or contracts while being charged or discharged, the exposed portions of the current collectors may be deformed toward each other.

DISCLOSURE OF THE INVENTION

The present invention provides an electrical storage device in which current collectors that each has a plurality of electrode parts thereon, in which the regions without the electrode parts of successive current collectors in the stacking direction are prevented from being deformed toward each other.

A first aspect of the present invention relates to an electrical storage device. The electrical storage device has a solid electrolyte layer; and electrode assemblies stacked with the solid electrolyte layer interposed therebetween and each electrode assembly including a current collector on which a plurality of electrode parts are provided. A part of the solid electrolyte layer is located between successive electrode parts in a direction perpendicular to the stacking direction on at least one of successive electrode assemblies in the stacking direction.

Here, portions of the solid electrolyte layer may be in contact with the electrode parts and the current collector.

In each of the electrode assemblies, the formation density of the electrode parts in a first region that is closer to the center in each of the electrode assemblies is lower than the formation density of the electrode parts in a second region on the side of a periphery in each of electrode assemblies from the first region.

The distance between successive electrode parts in a direction perpendicular to the stacking direction in the first region may be larger than the distance between successive electrode parts in a direction perpendicular to the stacking direction in the second region.

The thickness of the electrode parts in the stacking direction in the first region may be smaller than the thickness of the electrode parts in the stacking direction in the second region.

If a heat source is located in the vicinity of the electrical storage device, the formation density of the electrode parts in a first region that is near the heat source is lower than the formation density of the electrode parts in a second region that is away from the heat source in each of the electrode assemblies The solid electrolyte layer can be formed by applying a material for the solid electrolyte, layer on the electrode assemblies. The solid electrolyte layers may be composed of a gel electrolyte, a polymer solid electrolyte or an inorganic solid electrolyte. The electrode parts may contain an active material for a cathode or anode.

The electrical storage device has a first solid electrolyte layer; electrode assemblies stacked with the solid electrolyte layer interposed therebetween and each electrode assembly including a current collector on which a plurality of electrode parts are provided; and a second solid electrolyte layer located between successive electrode parts in a direction perpendicular to the stacking direction on at least one of the electrode assemblies located on both sides of the first solid electrolyte layer in the stacking direction.

According to the electrical storage device of the aspect of the present invention, when electrode assemblies each having a current collector on which a plurality of electrode parts are formed are used, successive electrode assemblies in the stacking direction may be separated by the solid electrolyte layer. Therefore, the regions without electrode parts of successive current collectors can be prevented from being deformed toward each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THR EMBODIMENTS

Description is hereinafter made of embodiments of the present invention.

Figure 1:
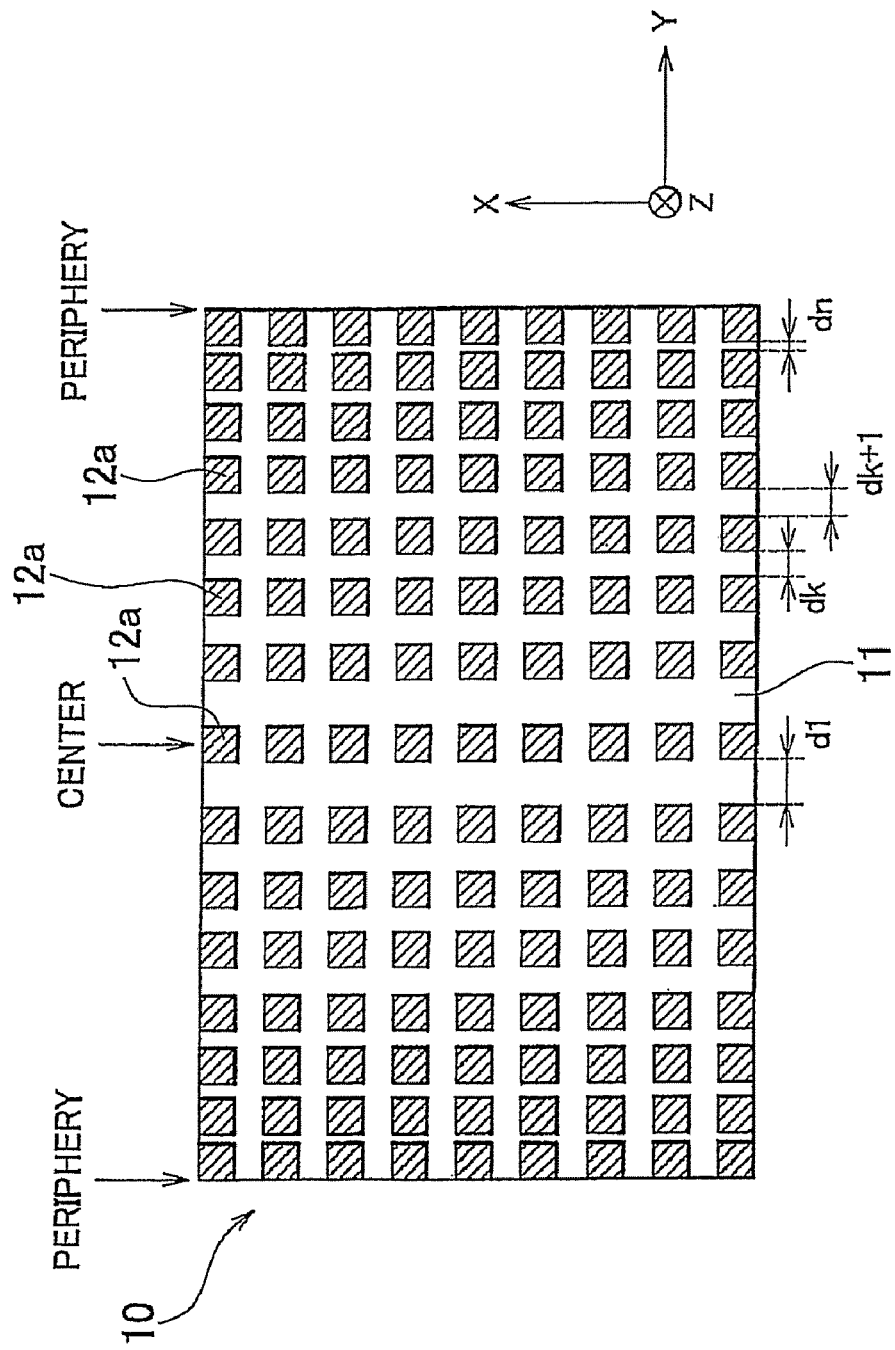
FIG. 1 is a front view of a bipolar electrode according to a first embodiment of the present invention.

A bipolar battery as an electrical storage device according to a first embodiment of the present invention is described with reference to FIG. 1 and FIG. 2. FIG. 1 is a front view of a bipolar electrode for use in the bipolar battery of this embodiment, and FIG. 2 is a cross-sectional view illustrating a part of the bipolar battery of this embodiment.

The bipolar battery of this embodiment is composed of a plurality of bipolar electrodes 10 stacked with solid electrolyte layers 13 interposed therebetween. In other words, the bipolar battery of this embodiment is an assembled battery composed of a plurality of unit cells (secondary batteries) stacked on top of one another.

Although description is made of a secondary battery in the following embodiments, the present invention is applicable to an electrical double layer capacitor (condenser) as an electrical storage device. The electrical double layer capacitor in this case is composed of a plurality of cathodes and anodes stacked alternately with separators interposed therebetween. In the electrical double layer capacitor, aluminum foil can be used as current collectors, activated charcoal as cathode active material and anode active material, and porous polyethylene film as separators.

Figure 2:
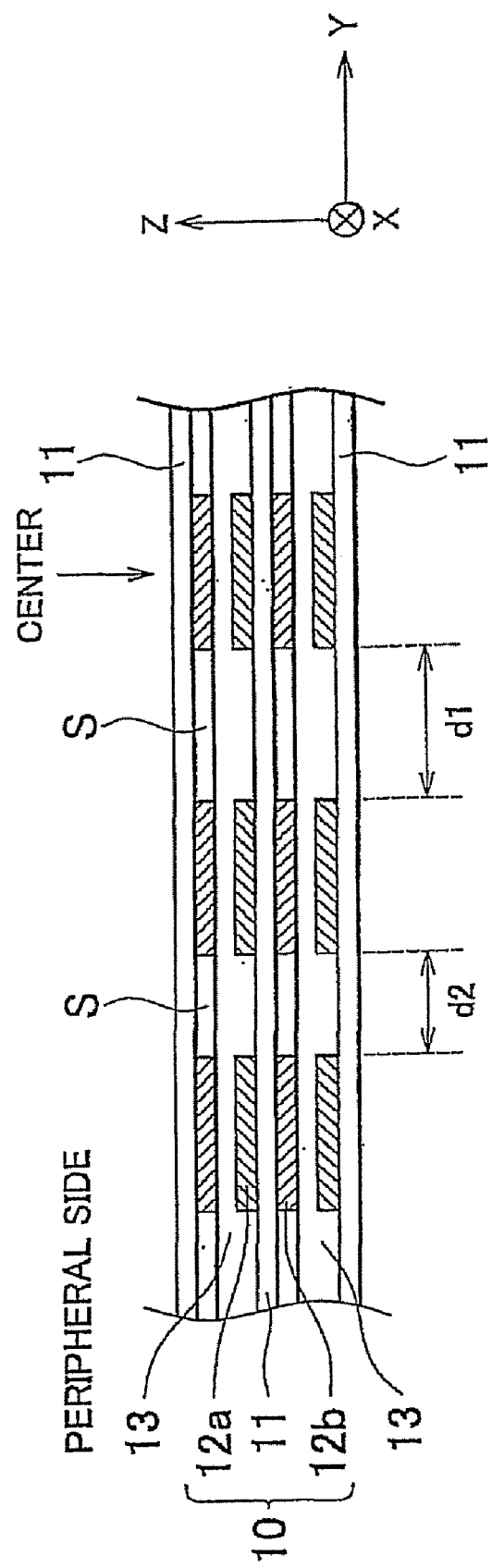
FIG. 2 is a cross-sectional view illustrating a part of the bipolar battery of the first embodiment.

As shown in FIG. 1 and FIG. 2, a plurality of electrode parts 12a are formed on a first side of a current collector 11 (X-Y plane). The electrode parts 12a are arranged in a prescribed array pattern as described later.

A plurality of electrode parts 12b are formed on a second side of the current collector 11, which is opposite the first side. The electrode parts 12b are arranged in the same array pattern as the electrode parts 12a shown in FIG. 1. That is, the electrode parts 12a and the electrode parts 12b are arranged symmetrically on opposite sides of the current collector 11.

The plurality of electrode parts 12a formed on the first side of the current collector 11 form an electrode layer (cathode layer). The plurality of electrode parts 12b formed on the second side of the current collector 11 form an electrode layer (anode layer).

The current collector 11 with electrode parts 12a and 12b formed thereon forms a bipolar electrode 10. While a case in which the bipolar electrode 10 is used is described in this embodiment, the present invention is not limited thereto. More specifically, an electrode composed of a current collector and the same electrode layers (cathode layers or anode layers) formed on both sides of the current collector or an electrode composed of a current collector and an electrode layer formed on one side of the current collector can be also used.

The current collector 11 may be made of aluminum foil or a plurality of metals, for example. A metal sheet coated with aluminum may be used as the current collector 11.

A composite current collector formed by bonding a plurality of metal foils may be used. In the composite current collector, aluminum may be used as a material for the cathode current collector and nickel or copper as a material for the anode current collector. Also, a composite current collector composed of a cathode current collector and an anode current collector in direct contact with each other or a composite current collector composed of a cathode current collector, an anode current collector, and an electrically conductive layer interposed between the cathode current collector and the anode current collector may be used.

The electrode parts 12a and 12b contain an active material for a cathode and an active material for an anode, respectively. The electrode parts 12a and 12b may contain a conductive aid, a binder, an inorganic solid electrolyte, a polymer gel electrolyte, polymer electrolyte or additive for improving ion conductivity, and so on as needed. Conventionally known materials may be used as materials for the electrode parts 12a and 12b.

For example, in a nickel-hydrogen battery, a nickel oxide may be used as a cathode active material for the electrode parts 12a and a hydrogen storage alloy such as $MmNi_{(5-x-y-z)}Al_xMn_yCo_z$ (Mm: misch metal) can be used as an anode active material for the electrode parts 12b. In a lithium secondary battery, a lithium-transition metal composite oxide may be used as a cathode active material for the electrode parts 12a, and carbon can be used as an anode active material for the electrode parts 12b. Acetylene black, carbon black, graphite, carbon fiber or carbon nanotube may be used as conductive agents.

The electrode parts 12a and 12b may be formed on the current collector 11 by, for example, ink-jet printing.

As shown in FIG. 1, each of the electrode parts 12a has a rectangular shape in a cross-section parallel to the X-Y plane, and all the electrode parts 12a are generally the same in size (area) (including manufacturing errors). All the electrode parts 12a have generally the same thickness (length in the Z-direction) (including manufacturing errors). The same is true with the electrode parts 12b.

A solid electrolyte layer 13 is interposed between successive bipolar electrodes 10 in the stacking direction (Z-direction). As shown in FIG. 2; the solid electrolyte layer 13 is also provided in the regions where electrode parts 12a are not present on the first side of the current collector 11. In other words, the electrode parts 12a formed on the current collector 11 are covered with the solid electrolyte layer 13.

A first side of the solid electrolyte layer 13 (the side in contact with the electrode parts 12b) has a generally flat surface (including manufacturing errors). A second side of the solid electrolyte layer 13 is shaped to mate with the side of a bipolar electrode with the electrode parts 12a thereon (patterned indented surface). Spaces S are formed between the first side of the solid electrolyte layer 13 and the side of the current collector 11 with the electrode parts 12b thereon.

The solid electrolyte layer 13 may be formed by, for example, applying an electrolyte on a side of the current collector 11 on which the electrode parts 12a have been formed. In this case, the solid electrolyte layer 13 is in contact with the peripheral surfaces of the electrode parts 12a and the regions without the electrode parts 12a on the current collector 11.

The method of forming the solid electrolyte layer 13 is not limited to the method described above. Any method may be used as long as a solid electrolyte layer 13 can be interposed between successive bipolar electrodes 10 with the electrode parts 12a covered with the solid electrolyte layer 13.

For example, the solid electrolyte layer 13 may be formed with a mold. That is, one side of the solid electrolyte layer 13 (the side to be in contact with the electrode parts 12b) is formed flat and a plurality of recesses are formed in the other side of the solid electrolyte layer 13 so that it can mate with the side of the bipolar electrode 10 with the electrode parts 12a thereon.

In this case, the protruding portions of the solid electrolyte layer 13 are located between successive electrode parts 12a. At this time, the protruding portions of the solid electrolyte layer 13 may or may not be in contact with the side faces of the electrode parts 12a (the faces of the electrode parts 12a extending in the thickness direction thereof) and the surface of the corresponding current collector 11.

Figure 3:
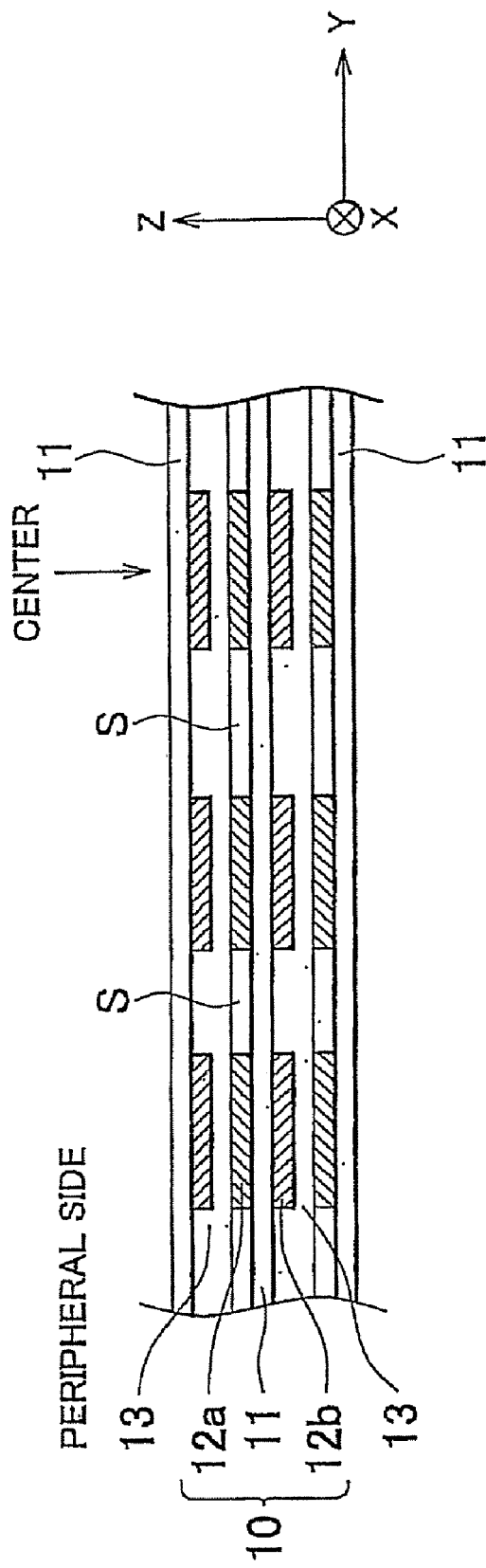
FIG. 3 is a cross-sectional view illustrating a configuration example of a part of the bipolar battery of the first embodiment.

While a case in which the solid electrolyte layers 13 cover the electrode parts 12a is described in this embodiment, the solid electrolyte layers 13 may cover the electrode parts 12b as shown in FIG. 3. In the configuration shown in FIG. 3, spaces S are formed between first sides of the solid electrolyte layers 13 and the sides of the current collectors 11 with the electrode parts 12b thereon.

Figure 4:
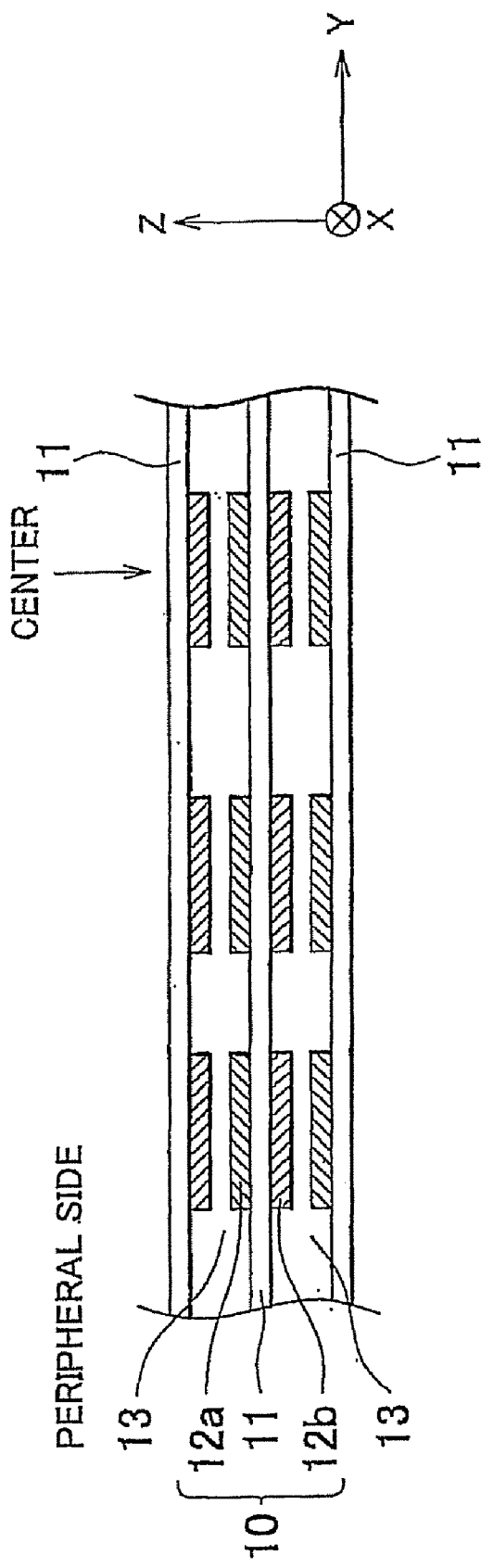
FIG. 4 is a cross-sectional view illustrating a configuration example of a part of the bipolar battery of the first embodiment.

Alternatively, the solid electrolyte layers 13 may cover the electrode parts 12a and 12b as shown in FIG. 4. In the configuration shown in FIG. 4, the gaps between successive bipolar electrodes 10 in the stacking direction may be filled with the solid electrolyte layers 13.

Figure 5:
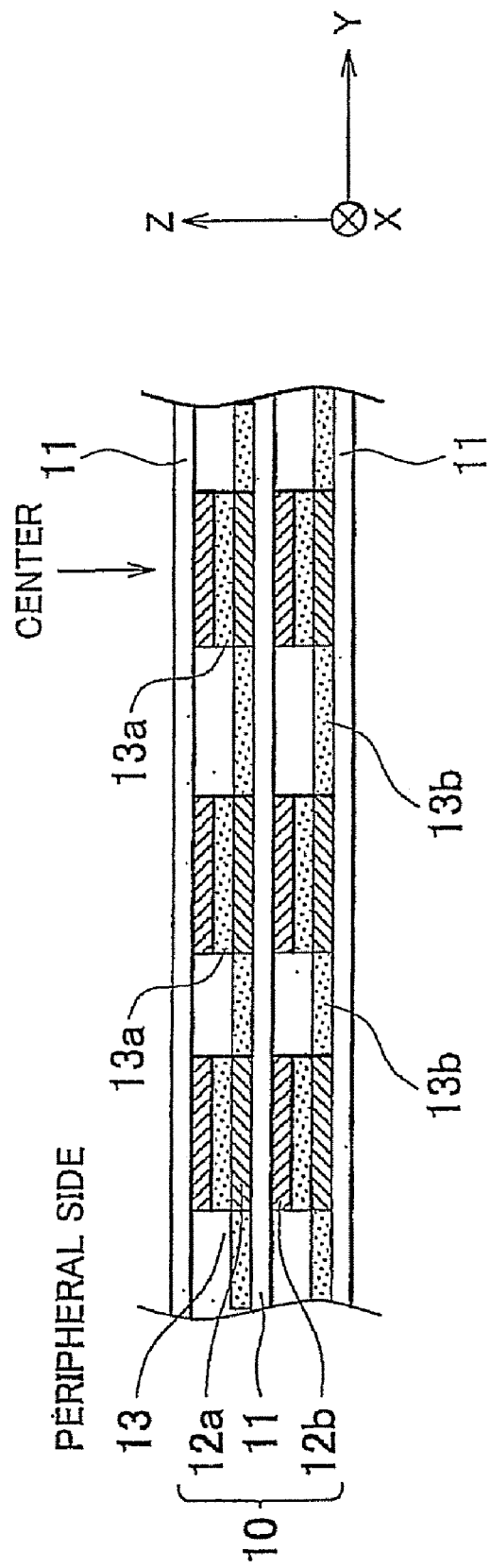
FIG. 5 is a cross-sectional view illustrating a configuration example of a part of the bipolar battery of the first embodiment.

Alternatively, solid electrolyte layers may be disposed as shown in FIG. 5. In the configuration shown in FIG. 5, first solid electrolyte layers 13a are interposed between successive electrode parts 12a and 12b in the stacking direction. Also, second solid electrolyte layers 13b are interposed between successive electrode parts 12a in a direction perpendicular to the stacking direction.

The second solid electrolyte layers 13b may be interposed between successive electrode parts 12b in a direction perpendicular to the stacking direction. Second solid electrolyte layers 13b may be interposed between successive electrode parts 12a in a direction perpendicular to the stacking direction and between successive electrode parts 12b in a direction perpendicular to the stacking direction.

The configuration shown in FIG. 5 may be achieved by forming solid electrolyte layers in, the regions without the electrode parts 12a on the current collector 11 by a coating method or the like and then forming solid electrolyte layers on top of the electrode parts 12a by a coating method or the like.

In this embodiment, successive bipolar electrodes 10 in the stacking direction are separated by the solid electrolyte layers 13. As a result, even if a current collector 11 is deformed in a region without the electrode parts 12b by an external force, the current collector 11 does not contact another current collector 11. Also, because the electrode parts 12a are covered with the solid electrolyte layers 13, the electrode parts 12a are prevented from separating from the current collectors 11. In addition, because only the solid electrolyte layers 13 are used, cost reduction can be achieved as compared to the case where another material is used to prevent contact between the current collectors 11.

The solid electrolyte layers 13 may be made of a polymer solid electrolyte, inorganic solid electrolyte or gel electrolyte. A gel electrolyte is a polymer electrolyte having ion conductivity in which an electrolytic solution is dispersed.

Polyethylene oxide (PEO), polypropylene oxide (PPO), and copolymers thereof can be used may be sued as the polymer solid electrolyte.

Nitrides, halides, oxysalts, and phosphorus sulfide compounds of Li, for example, may be used as the inorganic sold electrolyte. More specifically, $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $Li_2O$—$B_2O_3$, $Li_2O_2$—$SiO_2$, $Li_2S$—$GeS_4$, $Li_2S$—$P_2S_5$, and $LiI$—$Li_2S$—$P_2S_5$ may be used.

The array pattern of the electrode parts 12a will be described below.

The distance between successive electrode parts 12a in the Y-direction of a plurality of electrode parts 12a is varied as shown in FIG. 1. That is, the distance between successive electrode parts 12a is gradually decreased from the center of the bipolar electrode 10 (current collector 11) toward its peripheral portions. More specifically, there is a relation described below. The terms "center" and "peripheral" herein represent the positions in the plane perpendicular to the stacking direction (in the X-Y plane).

As shown in FIG. 1, the distance between the electrode parts 12a on the center portion of the current collector 11 and the electrode parts 12a successive thereto in the Y-direction is defined as d1. In other words, the Y-direction length of the region without the electrode parts 12a on the center portion of the current collector 11 is defined as d1. Similarly, the distance between the electrode parts 12a on the peripheral portions (edges) of the current collector 11 and the electrode parts 12a successive thereto in the Y-direction is defined as dn. The distance between the electrode parts 12a successive to each other at a certain position in the Y-direction is defined as dk.

At this time, the following relation holds: d1 > . . . dk > dk+1 > . . . dn, wherein k is a number within the range of 1 to n.

The distances (d1 to dn) between successive electrode parts 12a can be set based on a temperature distribution curve which is obtained when a bipolar electrode of a related art is used. The bipolar electrode of a related art herein is an electrode having a current collector with a single electrode layer formed on an entire surface thereof.

Figure 6:
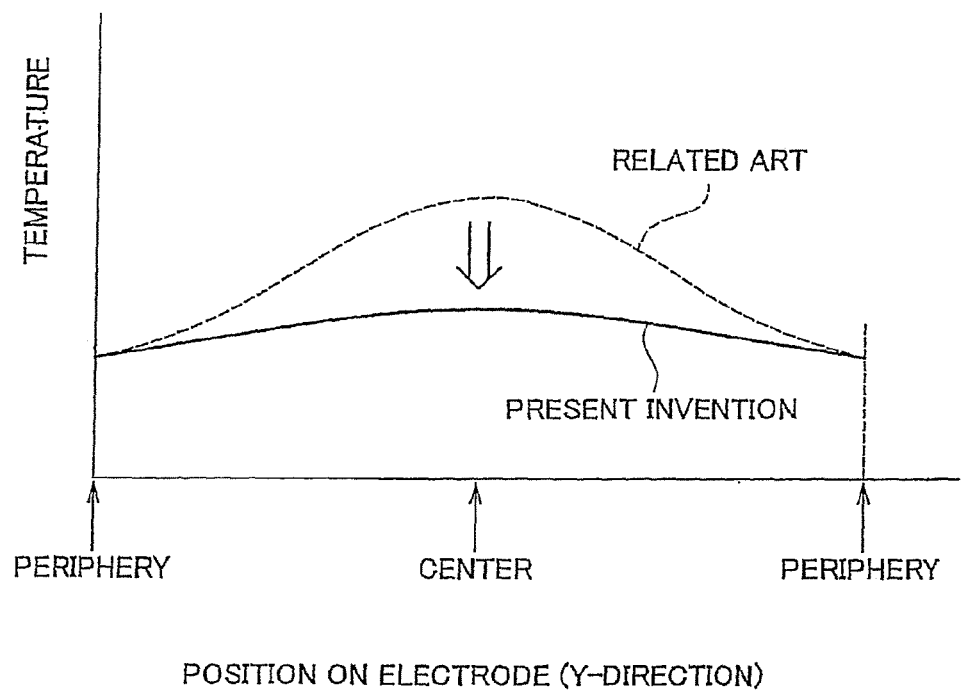
FIG. 6 is a graph showing the relation between the position and the temperature on bipolar electrodes.

FIG. 6 shows a temperature distribution curve on bipolar electrodes. In FIG. 6, the vertical axis represents the temperature on the bipolar electrodes, and the horizontal axis represents the position on the bipolar electrodes (the position in the Y-direction of FIG. 1).

In the bipolar electrode of the related art, because heat tends to accumulate in the middle portion, the temperature is highest at the center as shown by the dotted line of FIG. 6. The temperature gradually decreases from the center of the bipolar electrode toward its periphery. This is because the heat is more easily dissipated from the peripheral portions of the bipolar electrode.

The temperature distribution curve shown by a dotted line in FIG. 6, suggests that the distance between the electrode parts 12a should be largest in the center region and gradually decreases toward the peripheral regions. In other words, it is preferred that the distance between successive electrode parts 12a in a region closer to the center of the bipolar electrode in a direction parallel to the X-Y plane is greater than the distance between successive electrode parts 12a in a region closer to the peripheries thereof.

When the electrode parts 12a are arranged on the bipolar electrode 10 as described above, the temperature distribution curve shown by a solid line in FIG. 6 is obtained. That is, the thermal dissipation efficiency of the middle portion of the bipolar electrode 10 can be improved, and variation in temperature distribution in the Y-direction in the bipolar electrode 10 is reduced. In particular, when the distance between successive electrode parts 12a gradually increases from the peripheral regions toward the center region, the temperature distribution in the Y-direction in the bipolar electrode 10 can be generally uniform.

In the bipolar battery of this embodiment, spaces S are formed between the electrode parts 12b on the current collector 11 as shown in FIG. 2. Because the distances between the electrode parts 12b on the side of the center of the bipolar electrode 10 are greater than the distances between the electrode parts 12b towards the periphery of the bipolar electrode, the spaces S on the center side are larger than the spaces S near the periphery.

Thus, the heat generated in the middle portion of the bipolar electrode 10 is easily dissipated through the relatively large spaces S, and the thermal dissipation efficiency in the middle portion of the bipolar electrode 10 is improved accordingly. A cooling medium (cooling gas or liquid) may be supplied into the spaces S of the bipolar battery. In this case, the temperature rise on the bipolar electrode 10 can be prevented efficiently.

While the distance between successive electrode parts 12a in the Y-direction gradually increases from the peripheral portions of the current collector 11 toward the center thereof in this embodiment, the present invention is not limited thereto. More specifically, a case in which the distances between successive electrode part 12a in some regions are equal to each other (for example, a case in which dk=dk+1, see FIG. 1) may be included. That is, when the temperature difference on the bipolar electrode 10 may be maintained within a permissible range (including approximately zero) even if the distance between successive electrode parts 12a is not varied, the distances between successive electrode parts 12a may be constant.

Figure 7:
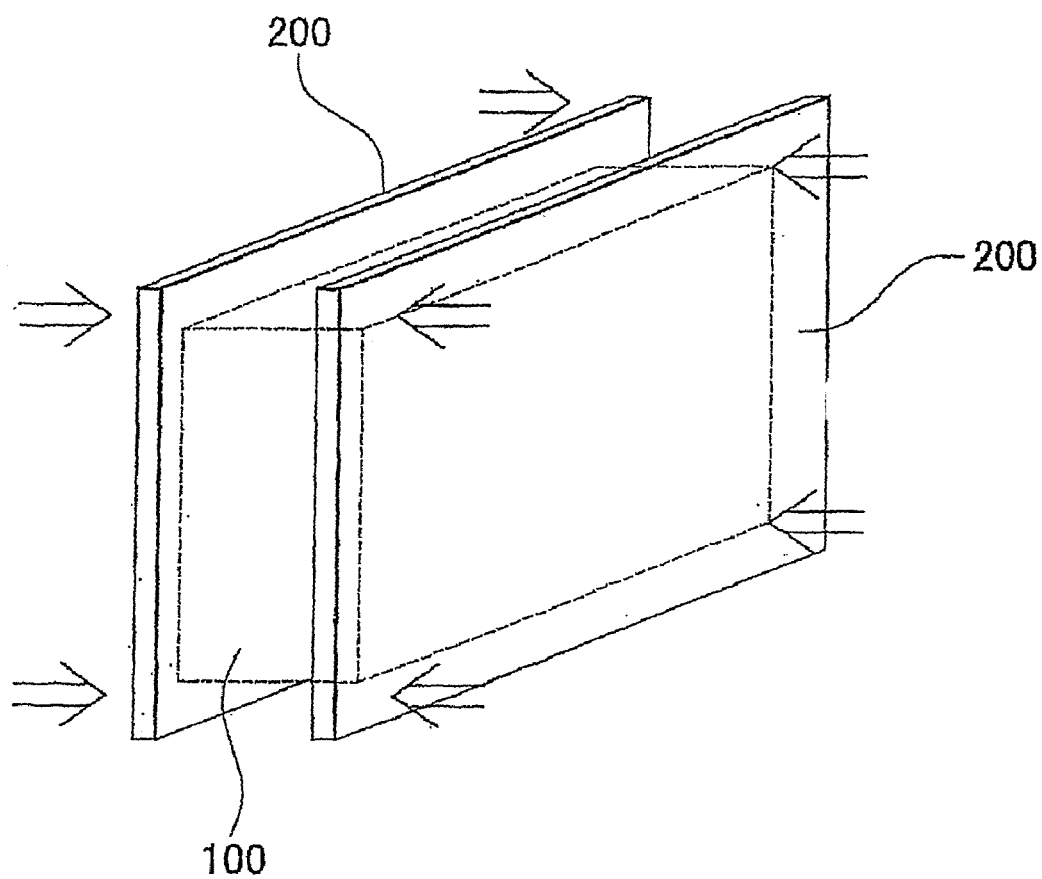
FIG. 7 is a view illustrating the clamping structure of a bipolar battery.

A bipolar battery 100 of this embodiment is clamped between end plates (clamp members) 200 from both sides (in the direction in which the bipolar electrodes 10 are stacked) as shown in FIG. 7 to prevent thermal expansion of the bipolar electrodes 10. More specifically, the bipolar battery 100 is clamped around its periphery as indicated by the arrows in FIG. 7.

In this configuration, however, thermal expansion of the peripheral portions of the bipolar battery 100 is be prevented but thermal expansion of the middle portion thereof is not be prevented. Thus, the middle portion of the bipolar battery 100 may become deformed by thermal expansion.

When the bipolar battery of this embodiment is used, because the thermal dissipation efficiency of the middle portion of the bipolar electrode 10 is higher than that of the peripheral portions thereof, thermal expansion of the middle portion is prevented. As a result, even when the structure shown in FIG. 7 is used, deformation of the middle portion of the bipolar battery 100 due to thermal expansion is prevented.

While the distance between successive electrode parts 12a in the Y-direction is varied as shown in FIG. 1 in this embodiment, the present invention is not limited thereto. The distance between successive electrode parts 12a in the X-direction may be varied, or the distances between successive electrode parts 12a in both the X-direction and Y-direction may be varied. In addition, the distance between the electrode parts 12a on the center side needs to be greater than the distance between the electrode parts 12a on the peripheral sides.

When the distances between successive electrode part 12a in both the X-direction and Y-direction are varied, variation in temperature distribution in the X-direction and Y-direction on the bipolar electrode is reduced.

While each of the electrode parts 12a and 12b has a rectangular cross-section in the direction parallel to the X-Y plane in this embodiment, the present invention is not limited thereto. The cross-sectional shape of the electrode parts 12a and 12b may be different. For, example, each electrode part 12a may have a polygonal shape such as a triangular shape or a circular shape in a cross-section parallel to the X-Y plane. Alternatively, electrode parts with different shapes may be formed on the current collector.

In addition, while a plurality of electrode parts 12a (and the electrode parts 12b as well) are arranged in a matrix as shown in FIG. 1 in this embodiment, the present invention is not limited thereto. For example, the electrode parts may be arranged concentrically around an electrode part located at the center of the bipolar electrode. Also in this case, the distance between the electrode parts 12a on the center side is set to be greater than the distance between the electrode parts 12a on the peripheral side.

When the electrode parts are arranged concentrically as described above, variation in temperature distribution in every direction in the X-Y plane on the bipolar electrode is reduced.

Figure 8:
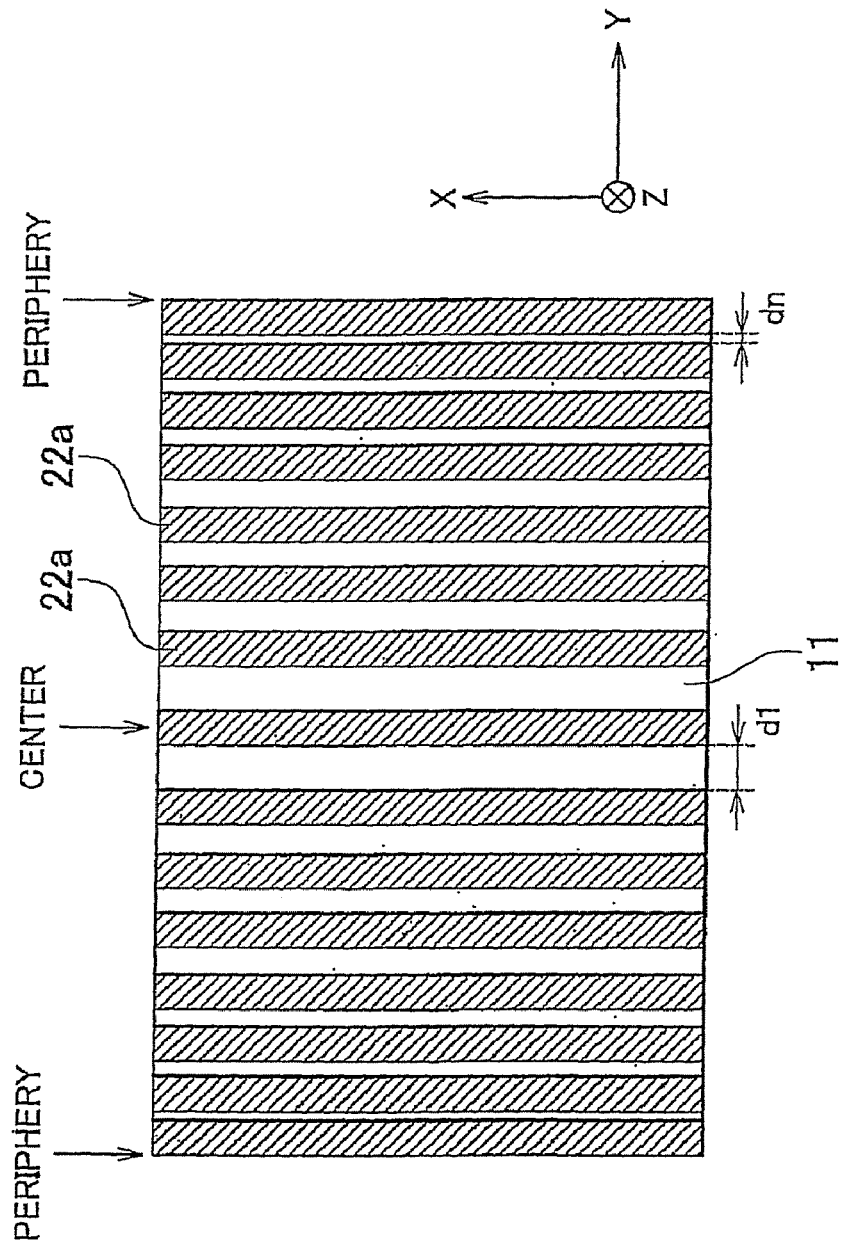
FIG. 8 is a front view of a bipolar electrode as a modification of the first embodiment.

A plurality of electrode parts 22a extending in the X-direction may be aligned in the Y-direction as shown in FIG. 8. Also in this case, the distance between the electrode parts 12a is increased from, the peripheral portions of the current collector 11 toward the center thereof. At least the electrode parts (including the electrode parts 22a) formed on one of side of the current collector 11 are covered with a solid electrolyte layer.

In addition, while all the electrode parts 12a formed on the current collector 11 have generally the same thickness (length in the Z-direction of FIG. 2) in this embodiment, the present invention is not limited thereto. That is, the thickness of the electrode parts may be varied depending on the position on the current collector 11.

Figure 9:
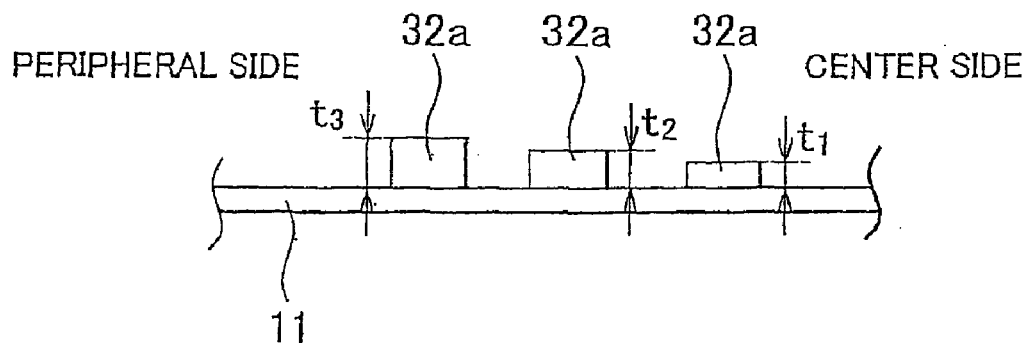
FIG. 9 is a side view of one example of the bipolar electrode of the first embodiment.

More specifically, the one on the center side of two successive electrode parts in a specific direction (X-direction or Y-direction) may have a thickness smaller than that of the electrode part on the peripheral side. As shown in FIG. 9, the thickness of electrode parts 32a may gradually decrease from the peripheral portions of the bipolar electrode toward the center thereof (t1<t2<t3). In other words, it is preferred that the thickness of the electrode parts 12a on the center side in a direction parallel to the X-Y plane is smaller than the thickness of the electrode parts 12a on the peripheral sides. At least two electrode parts having generally the same thickness (including manufacturing errors) may be included.

When the electrode parts 32a have different thicknesses as described above, the thickness of the solid electrolyte layer (which corresponds to the solid electrolyte layer 13 shown in FIG. 2) is preferably varied. In this configuration, the distance between two successive current collectors 11 in the stacking direction can be generally uniform. Also in this case, a solid electrolyte layer covers at least the electrode parts on one side of the current collector 11.

When the thickness of the electrode parts 32a on the side of the center of the current collector 11 is smaller as described above, the current density on the center side is decreased, which reduces the amount of heat generated on the center side. As a result, variation in temperature distribution on the bipolar electrode is reduced.

The density of the active material in the electrode parts (the volume ratio of cathode active material in the electrode parts) may be varied depending on the position on the current collector 11. More specifically, the active material density in the electrode parts on the side of the center of the bipolar electrode may be lower than the active material density in the electrode parts on the side of the peripheries thereof. The active material density in the electrode parts may gradually decrease from the peripheral portions of the bipolar electrode toward the center thereof. At least two electrode parts having generally the same active material density (including manufacturing errors) may be included.

When the active material density in the electrode parts on the center side is lower as described above, the current density on the center side is decreased, which reduces heat generation on the center side. As a result, variation in temperature distribution on the bipolar electrode is also reduced.

The electrode parts may be formed based on the three parameters: the distance between electrode parts, the thickness of the electrode parts, and the active material density in the electrode parts. When the thickness of the electrode parts and the active material density in the electrode parts, as well as the distance between the electrode parts, are varied, the regions without electrode parts on the current collector 11 can be decreased.

Figure 10:
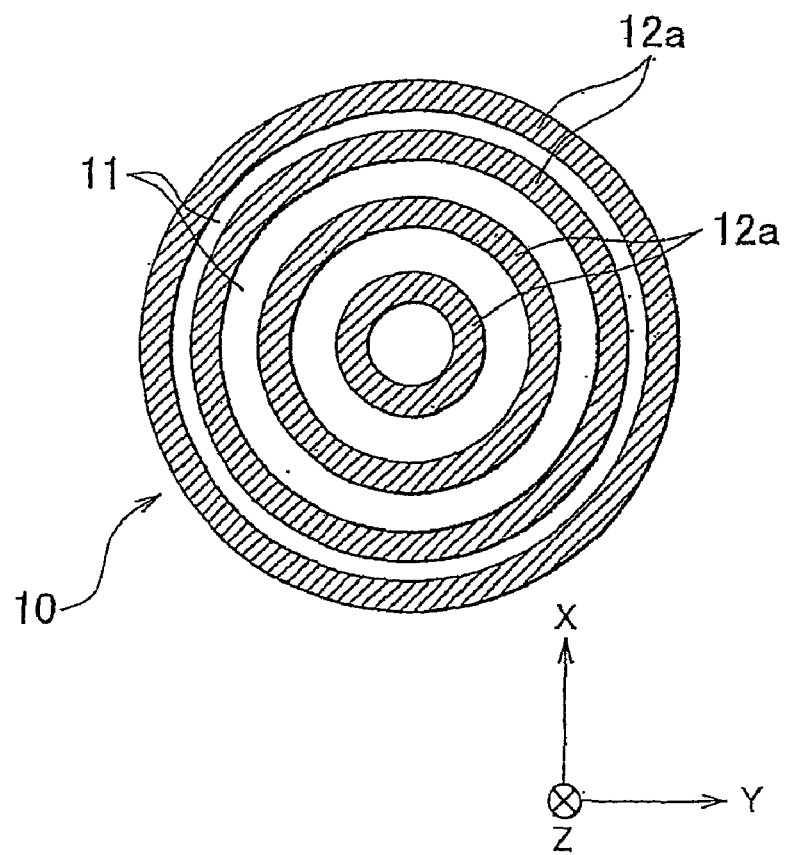
FIG. 10 is a front view of a bipolar electrode for use in a cylindrical battery.

The bipolar electrode may be configured as shown in FIG. 10. FIG. 10 is a front view of a bipolar electrode. Members having the same function as the members described with reference to FIG. 1 are designated by the same reference numerals.

As shown in FIG. 10, a plurality of electrode parts 12a are concentrically formed on one side of a current collector 11 having a generally circular shape. A plurality of electrode parts (not shown) are formed on the opposite side of the current collector 11 in the same array pattern as the electrode parts 12a. In this embodiment, the plurality of electrode parts 12a form a cathode layer, and the plurality of electrode parts formed on the opposite side of the current collector 11 form an anode layer.

The electrode parts 12a have generally the same width (length in the radial direction) (including manufacturing errors). The distance between successive electrode parts 12a in the radial direction gradually increases from the periphery toward the center. A region in which the distances between successive electrode parts 12a are generally the same (including manufacturing errors) may be included.

In the configuration of the bipolar electrode 10 shown in FIG. 10, heat tends to accumulate in the radially inner region rather than in the radially outer region. Thus, when the distance between the electrode parts 12a in the radially inner region is greater than the distance between the electrode parts 12a in the radially outer region, the thermal dissipation properties of the radially inner portion is improved. As a result, variation in temperature distribution in the X-Y plane is reduced.

When a plurality of bipolar electrodes 10 as shown in FIG. 10 are prepared and the bipolar electrodes 10 are stacked in the Z-direction with solid electrolyte layers (not shown) interposed therebetween, a cylindrical battery can be obtained. Also in this configuration, a solid electrolyte layer may cover at least the electrode parts formed one side of the current collector 11 as in the configuration shown in FIG. 2 to FIG. 4.

Because solid electrolyte layers are disposed to separate successive bipolar electrodes in the stacking direction (Z-direction), the regions of the current collectors 11 without electrode parts are prevented from contacting each other. Also, because the solid electrolyte layers covers the electrode parts formed on the current collectors 11, the electrode parts are prevented from separating from the current collectors 11.

The thickness (length in the Z-direction) of the electrode parts 12a and/or the active material density in the electrode parts 12a may be varied as described with reference to FIG. 9 etc. in addition to the configuration shown in FIG. 10.

A battery may be also formed by rolling up a bipolar electrode.

Figure 11:
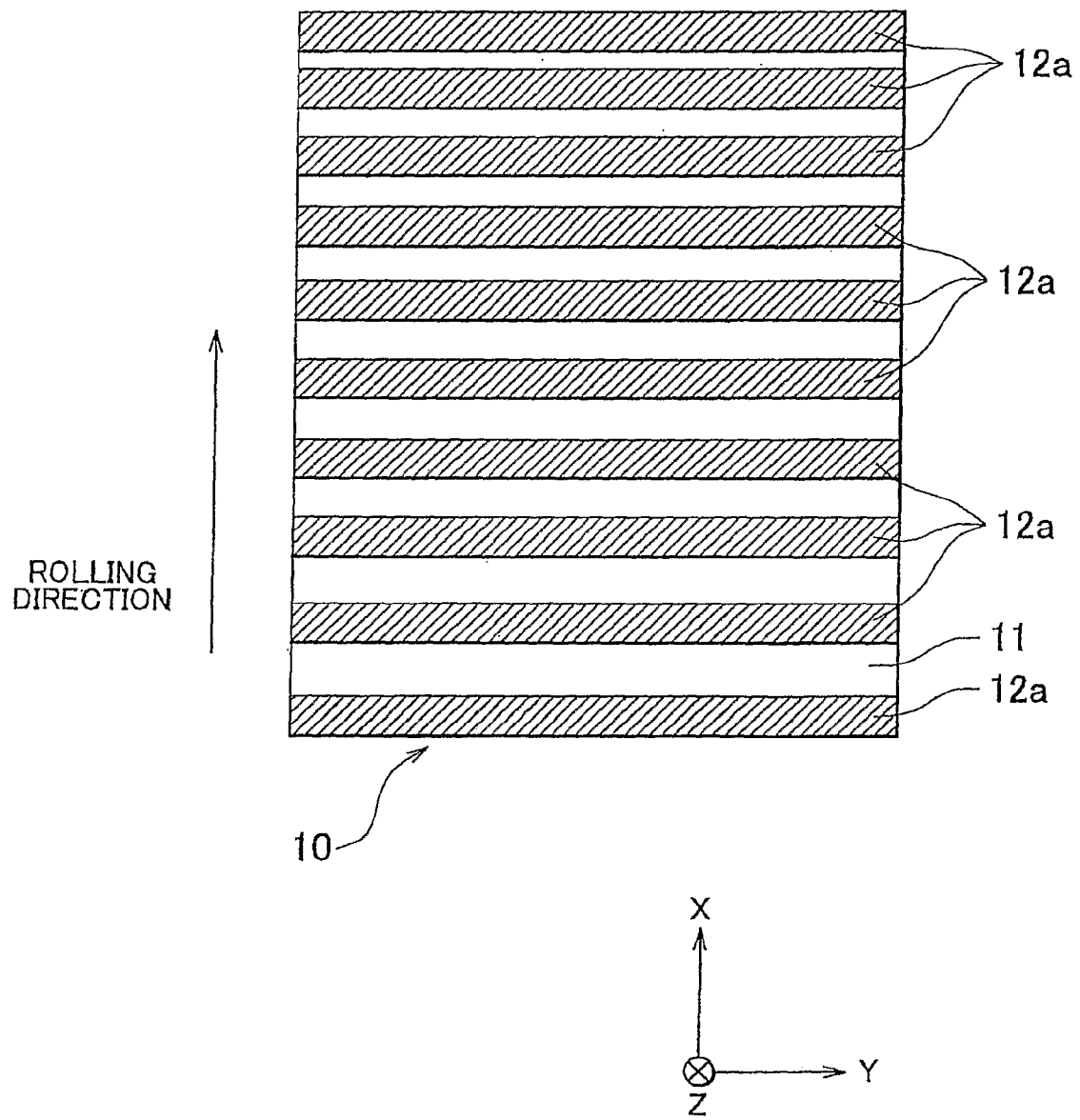
FIG. 11 is a front view of a bipolar electrode for use in a cylindrical battery.

More specifically, a plurality of electrode parts 12a extending in the Y-direction are formed on one side of a current collector 11 as shown in FIG. 11, and a plurality of electrode parts (not shown) are formed on the other side of the current collector 11 in the same array pattern as the electrode part 12a, thereby forming a bipolar electrode 10. The electrode parts 12a form a cathode layer, and the plurality of electrode parts formed on the opposite side of the current collector 11 form an anode layer.

As shown in FIG. 11, the plurality of electrode parts 12a have generally the same width (length in the X-direction). The distance between successive electrode parts 12a in the X-direction gradually decreases from the bottom toward the top as viewed in FIG. 11. A region in which the distance's between successive electrode parts 12a remains substantially the same (including manufacturing errors) may be included.

When the bipolar electrode 10 shown in FIG. 11 is rolled up from the lower end as viewed in FIG. 11 in the direction indicated by an arrow, a cylindrical battery may be formed. A solid electrolyte layer is formed on at least one side of the bipolar electrode 10. The solid electrolyte layer covers the electrode parts formed on the current collector.

In a cylindrical battery formed by rolling up one bipolar electrode 10, heat tends' to accumulate in the central region in the radial direction of the rolled electrode than in a radially outer region.

Thus, when the distance between the electrode parts 12a lying radially inside (in a lower region of FIG. 11) is greater than the distance between the electrode parts 12a lying radially outside (in an upper region of FIG. 11), the thermal dissipation properties of the radially inner region can be improved. As a result, variation in temperature distribution is also reduced in the cylindrical battery.

Because the solid electrolyte layer separates successive portions of the bipolar electrode in the stacking direction (Z-direction), the regions of the current collector 11 without electrode parts are prevented from contacting each other. Also, because the solid electrolyte layer covers at least the electrode parts formed on one side of the current collector 11, the electrode parts are prevented from separating from the current collector 11.

Figure 12:
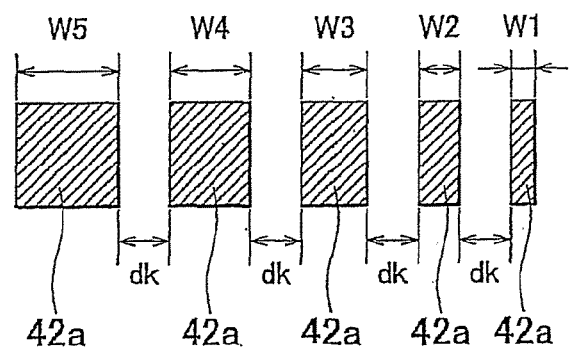
FIG. 12 is a schematic view illustrating the configuration of electrode parts of a bipolar electrode according to a second embodiment of the present invention.

A bipolar battery as a second embodiment of the present invention is next described with reference to FIG. 12. FIG. 12 is a view illustrating a part of a bipolar electrode for use in the bipolar battery of the second embodiment.

In the first embodiment described above, a configuration in which the electrode parts have generally the same width and the distance between successive electrode parts is varied is described. In the second embodiment, the distances between successive electrode parts are generally the same (including manufacturing errors) and the electrode parts have different widths (areas).

More specifically, the size (width in the Y-direction) of the electrode parts 42a gradually decreases from the peripheral portions of the bipolar electrode (current collector) toward the center thereof as shown in FIG. 12. That is, the distances between successive electrode parts 42a in the Y-direction have the same value dk (a certain value) and the widths W1 to W5 of the electrode parts 42a have the following relation: W5>W4>W3>W2>W1.

A plurality of electrode parts are formed in the array pattern as shown in FIG. 12 on both sides of the current collector to form a bipolar electrode. The plurality of electrode parts formed on one side of the current collector form a cathode layer, and the plurality of electrode parts formed on the other side of the current collector form an anode layer.

In the bipolar battery of this embodiment, a plurality of bipolar electrodes as described above are stacked with solid electrolyte layers interposed therebetween. The solid electrolyte layers separate successive bipolar electrodes in the stacking direction and cover at least the electrode parts formed one side of each bipolar electrode as in the first embodiment.

In the configuration of the second embodiment, the formation density of the electrode parts 42a on the side of the center of the bipolar electrode may be lower than the formation density of the electrode parts 42a near the periphery of the battery, as in the first embodiment, the thermal dissipation properties of the side of center of the bipolar electrode can be improved. As a result, variation in temperature distribution on the bipolar electrode can be reduced.

Because solid electrolyte layers separate successive bipolar electrodes in the stacking direction, the regions of the current collectors without electrode parts are prevented from contacting each other. Also, because the solid electrolyte layers cover the electrode parts of the bipolar electrodes, the electrode parts are prevented from separating from the current collectors.

While the widths W1 to W5 of the electrode parts 42a aligned in the Y-direction are all different in the configuration shown in FIG. 12, at least two electrode parts having generally the same width may be included.

Also in this embodiment, the electrode parts 42a may have different thicknesses and/or different active material densities as described in the first embodiment. The width of the electrode parts may be varied as in this embodiment with the distance between the electrode parts varied as in the first embodiment.

In addition, the configuration of FIG. 10 or FIG. 11 described in the first embodiment may be applied. That is, although the distances between successive electrode parts are varied and the electrode parts have generally the same width in the configuration of the bipolar electrode shown in FIG. 10 or FIG. 11, the electrode parts may have different widths with the distances between successive electrode parts being generally the same.

More specifically, in the configuration of the bipolar electrode shown in FIG. 10, the width of the electrode parts in the radially inner region may be smaller than the width of the electrode parts in the radially outer region with the distances between successive electrode parts in the radial direction being generally the same. In the configuration of the bipolar electrode shown in FIG. 11, the width (length in the X-direction) of the electrode parts in a lower part as viewed in FIG. 11 may be smaller than the width (length in the X-direction) of the electrode parts in an upper part as viewed in FIG. 11 with the distances between successive electrode parts in the X-direction being generally the same.

While the first and second embodiments described above relate to the arrangement of electrode parts on a bipolar electrode (in the X-Y plane), the array pattern of the electrode parts on the bipolar electrode may be changed depending on the position in the stacking direction in a bipolar battery in which a plurality of bipolar electrodes are stacked.

In a bipolar battery having a stack structure, the tendency for heat to escape is different between center and outer end regions in the stacking direction. Thus, the temperature distributions on the bipolar electrodes are different from each other. Therefore, when the array pattern of the electrode parts on the bipolar electrode is changed depending on the position in the stacking direction, variation in temperature distribution between the bipolar electrodes in the stacking direction can be reduced.

More specifically, the distance between the electrode parts at a position on a bipolar electrode in a center region can be set greater than the distance between the electrode parts at a position corresponding to the above position in the stacking direction on a bipolar electrode in an outer end region in the configuration described in the first embodiment (FIG. 1). More specifically, the distance d1 between the electrode parts on the center portion (see FIG. 1) of a bipolar electrode in a center region can be greater than the distance d1 between the electrode parts on the center portion of a bipolar electrode in an outer end region.

Although the array pattern of the electrode parts (the distances between the electrode parts, the widths of the electrode parts, etc.) are set in view of a heat dissipation characteristic of the bipolar battery itself in the first and second embodiments described above, the array pattern of the electrode parts may be set in view of a heat dissipation characteristic of the bipolar battery which is determined by the influence of external thermal factors. The details are described below.

For example, when a heat source (engine, motor or the like) is located near the bipolar battery, more specifically, when a heat source is located in a direction perpendicular to the stacking direction of the bipolar battery, the thermal influence of the heat source may reduce the heat dissipation properties of the portion of the bipolar battery near the heat source relative to the heat dissipation properties of the other portions of the bipolar battery.

In this case, when the formation density of the electrode parts near the heat source regions on the bipolar electrodes is lower than those in the other regions, variations in temperature distribution on each bipolar electrode is reduced. More specifically, the distance between the electrode parts, the width of the electrode part etc., are varied as in the first and second embodiments to vary the formation density of the electrode parts on the current collectors.

Here, when the temperature distribution characteristic of a bipolar electrode in view of the thermal influence from a heat source, the formation density of the electrode parts can be set.

When a heat source is located in the stacking direction of the bipolar battery, the formation density of the electrode parts in regions corresponding to one another in the stacking direction in a plurality of bipolar electrodes may be varied.

More specifically, the formation density of the electrode parts in at least one bipolar electrode on the heat source side (the bipolar electrode at one end in the stacking direction) of a plurality of bipolar electrodes stacked on top of one another is lower than those in the other bipolar electrodes (for example, the bipolar electrode at the other end in the stacking direction).

While a case where the formation density of the electrode parts on a bipolar electrode is varied is described in the first and second embodiments, the present invention is applicable to a case where the formation density of the electrode parts is generally uniform on the entire surface of a bipolar electrode. Also in this case, the regions without electrode parts of the current collectors 11 are prevented from contacting each others and the electrode parts formed on the current collectors 11 are prevented from separating from the current collectors 11.

The bipolar battery described in the first and second embodiments may be used as, for example, an electrical storage device for driving a motor in electrical vehicles (EV), hybrid vehicles (HEV), and fuel cell vehicles (FCV).

While the invention has been described with reference to example embodiments thereof, it is to be understood that the invention is not limited to the described embodiments or constructions. On the other hand, the invention is intended to cover various modifications and equivalent arrangements. In addition, while the various elements of the described invention are shown in various example combinations and configurations, other combinations and configurations, including more, less or only a single element, are also within the scope of the appended claims.

The invention claimed is:

1. An electrical storage device, comprising:
   a solid electrolyte layer; and
   electrode assemblies stacked with the solid electrolyte layer interposed therebetween, each electrode assembly including a current collector on which a plurality of electrode parts are provided,
   wherein a part of the solid electrolyte layer is located between successive electrode parts in a direction perpendicular to the stacking direction on at least one of successive electrode assemblies in the stacking direction, and
   wherein, in each of the electrode assemblies, a formation density of the electrode parts in a first region that is closer to the center in each of the electrode assemblies is lower than a formation density of the electrode parts in a second region on the side of a periphery in each of the electrode assemblies from the first region.

2. The electrical storage device according to claim 1, wherein portions of the solid electrolyte layer are in contact with the electrode parts and the current collector.

3. The electrical storage device according to claim 1, wherein the distance between successive electrode parts in a direction perpendicular to the stacking direction in the first region is larger than the distance between successive electrode parts in a direction perpendicular to the stacking direction in the second region.

4. The electrical storage device according to claim 3, wherein the thickness in the stacking direction of the electrode parts in the first region is smaller than the thickness in the stacking direction of the electrode parts in the second region.

5. An electrical storage device, comprising:
   a solid electrolyte layer; and
   electrode assemblies stacked with the solid electrolyte layer interposed therebetween, each electrode assembly including a current collector on which a plurality of electrode parts are provided,
   wherein a part of the solid electrolyte layer is located between successive electrode parts in a direction perpendicular to the stacking direction on at least one of successive electrode assemblies in the stacking direction, and
   wherein a heat source is located in the vicinity of the electrical storage device, and a formation density of the electrode parts in a first region that is near the heat source is lower than a formation density of the electrode parts in a second region that is away from the heat source in each of the electrode assemblies.

6. The electrical storage device according to claim 1, wherein the solid electrolyte layer is formed by applying a material for the solid electrolyte layer on the electrode assemblies.

7. The electrical storage device according to claim 1, wherein the electrode parts contain an active material for a cathode or anode.

8. The electrical storage device according to claim 1, wherein the solid electrolyte layer is composed of at least one of a gel electrolyte, a polymer solid electrolyte, and an inorganic solid electrolyte.

9. An electrical storage device, comprising:
   a first solid electrolyte layer;
   electrode assemblies stacked with the first solid electrolyte layer interposed therebetween, each electrode assembly including a current collector on which a plurality of electrode parts are provided; and
   a second solid electrolyte layer located between successive electrode parts in a direction perpendicular to the stacking direction on at least one of the electrode assemblies located on both sides of the first solid electrolyte layer in the stacking direction,
   wherein, in each of the electrode assemblies, a formation density of the electrode parts in a first region that is closer to the center in each of the electrode assemblies is lower than a formation density of the electrode parts in a second region on the side of a periphery in each of electrode assemblies from the first region.

10. The electrical storage device according to claim 5, wherein the solid electrolyte layer is formed by applying a material for the solid electrolyte layer on the electrode assemblies.

11. The electrical storage device according to claim 5, wherein the electrolyte parts contain an active material for a cathode or anode.

12. The electrical storage device according to claim 5, wherein the solid electrolyte layer is composed of at least one of a gel electrolyte, a polymer solid electrolyte, and an inorganic solid electrolyte.

* * * * *